Patented Aug. 30, 1938

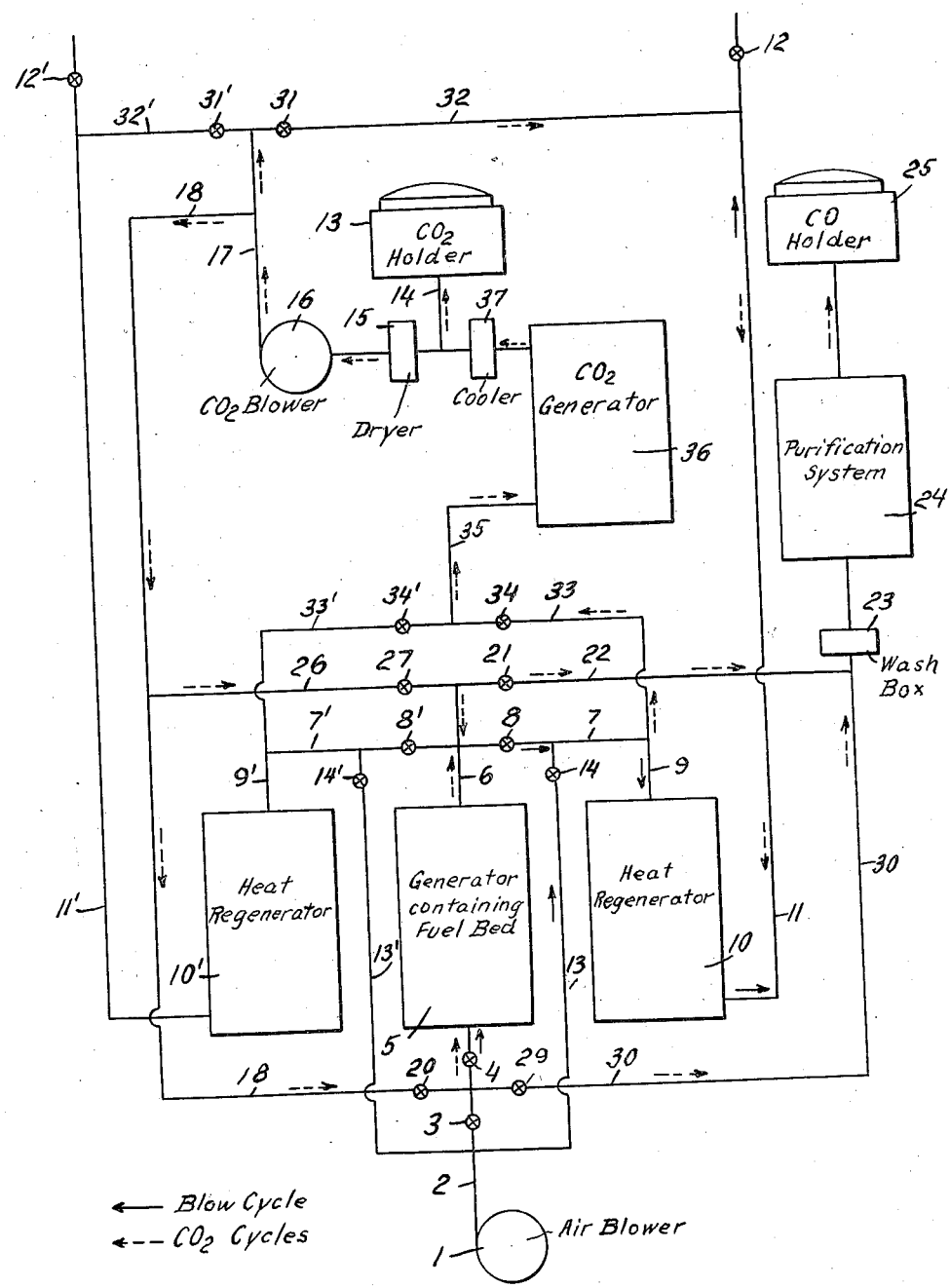

2,128,262

UNITED STATES PATENT OFFICE 2,128,262

CARBON MONOXIDE MANUFACTURE

Louis L. Newman, Brooklyn, N. Y., assignor to Semet-Solvay Engineering Corporation, New York, N. Y., a corporation of New York Application September 5, 1935, Serial No. 39,248

6 Claims. (Cl. 23—204)

This invention relates to the manufacture of substantially pure carbon monoxide.

An object of this invention is to provide an efficient and economical process for the manufacture of carbon monoxide of high purity by the reduction of carbon dioxide.

Another object is to provide a cyclic process for the manufacture of carbon monoxide of high purity involving alternating cycles, in one of which a bed of fuel such as carbonaceous material, preferably coke or charcoal is blasted with an oxygen containing gas to produce blast gases and heat the fuel to incandescence and the sensible and latent heat of the blast gases are stored in a heat regenerator. In the other cycle a stream of carbon dioxide is circulated through the heat regenerator and a body of carbon dioxide-containing material such as calcium carbonate to liberate additional carbon dioxide while a portion of the circulating stream of carbon dioxide is withdrawn and passed through the hot fuel bed and thus reduced to carbon monoxide. Other objects and advantages of this invention will appear from the following description thereof.

Briefly, the process of this invention involves the blasting of a bed of fuel such as coke or other carbonaceous material with an oxidizing gas such as air, oxygen, or oxygen mixed with air, to heat the fuel bed to incandescence. The blast gases produced in this step are burned in the heat regenerator, thus storing therein the sensible and latent heat i. e., the heat of combustion of the blast gases. When the fuel bed has reached the desired temperature the blasting step is discontinued and carbon dioxide circulated through the heat regenerator where it is heated and then through a bed of limestone, dolomite, calcium carbonate or other carbon dioxide-containing material. A portion of the carbon dioxide stream circulating through the heat regenerator and body of carbon dioxide containing material is continuously removed and passed through the hot fuel bed where it is reduced to carbon monoxide. The amount of carbon dioxide removed from the circulating stream may be equal to that liberated by the passage of carbon dioxide through the carbon dioxide-containing material so that the amount of carbon dioxide circulating through the heat regenerator and body of carbon dioxide-containing material is maintained substantially constant. Preferably, the carbon dioxide stream flowing from the carbon dioxide-containing material is passed through a drier which may contain activated alumina or other material for the absorption of moisture prior to the removal therefrom of a portion of the carbon dioxide which is passed through the hot fuel bed. By so doing, the presence of moisture in the carbon dioxide passed through the fuel bed is avoided and hence the gas resulting from the reduction of the carbon dioxide stream passed through the hot fuel bed is substantially free of hydrogen.

In the accompanying drawing there is shown, somewhat diagrammatically, for purposes of exemplification, a preferred arrangement of apparatus for practicing the process of this invention.

In the drawing, reference numeral 5 indicates a generator which may be provided with a stationary grate or any type of mechanical grate on which rests a bed of fuel such as coke. Generator 5 communicates with a heat regenerator 10 and a second regenerator 10' through valve controlled pipe lines which permit flow from either above or below the fuel bed in the generator into the heat regenerators, as will more fully appear hereinafter. Generator 5 is equipped with a pump or blower 1 communicating therewith by the valve controlled line 2.

A carbon dioxide generator 36 communicates with heat regenerator 10 through lines 35, 33 and 9, and also with heat regenerator 10' through lines 35, 33' and 9'. Carbon dioxide generator 36 also communicates with a cooler 37 and drier 15. A pump 16 is provided for circulating carbon dioxide through the regenerator 10 or 10', as the case may be, into and through the carbon dioxide generator 36, cooler 37 and drier 15.

A line 18 is provided leading from line 17 to the generator 5. The gas off-take line 30 leads from the generator 5 to a wash box 23 which in turn communicates with the gas purification system 24 connected with a carbon monoxide holder 25. A carbon dioxide holder 13 is connected by means of line 14 with the line leading from the carbon dioxide generator 36 and may be used for storing carbon dioxide as will be hereinafter more fully described, and for insuring a supply of carbon dioxide at a uniform pressure for passage to the generator 5.

In operation, assuming all the valves shown in the accompanying drawing are closed, valves 3, 4, 8 and 12 are opened. A blast of air or other oxygen containing gas is then blown by blower 1 through line 2 into and through the generator 5 containing the bed of fuel. The blasting of the fuel bed is continued until the fuel reaches an incandescent state, i. e., the fuel bed is brought to an elevated temperature such that carbon dioxide passed therethrough will be reduced to carbon monoxide. Usually a blast period of about four minutes will be sufficient. The blast gases formed in generator 5 are discharged through pipes 6, 7 and 9 into the heat regenerator 10. Valve 14 may be opened and secondary air or other oxygen containing gas may be passed through pipe 13 by blower 1 into the pipe line 7, the air supporting combustion of the blast gases, which as above indicated, flow from generator 5 through lines 6, 7 and 9, into the heat regenerator 10. The interior of heat regenerator 10 may be filled with refractory material, for example, fire brick, which functions to store the sensible and latent heat of the blast gases burning in regenerator 10 and passing therethrough. Waste gases from the regenerator 10 flow through pipe 11 and valve 12 into and through a waste heat boiler such as a steam boiler (not shown) or into the atmosphere. When the temperature of heat regenerator 10 has reached about 2000° F. and the fuel bed in generator 5 has been brought to an incandescent state the blasting cycle may be discontinued by closing valves 3, 8, 12 and 14.

Carbon dioxide which may be stored in reservoir 13 or may be obtained from any suitable source as, for example, by gasifying solid carbon dioxide, is circulated by pump 16 through pipe 17 line 32 (valve 31 being open) and line 11 into and through the regenerator 10 where the carbon dioxide is heated. From the regenerator 10 the hot carbon dioxide passes through pipe lines 9 and 33 (valve 34 being open) and line 35 into the carbon dioxide generator 36. Generator 36 may contain calcium carbonate or other carbon dioxide-containing material. The passage of the carbon dioxide through the heat regenerator 10 raises the temperature thereof to a point above that necessary to decompose the calcium carbonate and liberate carbon dioxide. From the generator 36 the carbon dioxide liberated in this generator, as well as that circulated through the heat regenerator 10 and the generator 36, passes through a cooler 37. This cooler functions to lower the temperature of the carbon dioxide gas stream to a point where it can be efficiently passed through drier 15 containing activated alumina and the moisture removed from the gaseous stream.

During the circulation of the carbon dioxide through the heat regenerator 10 and carbon dioxide generator 36, a portion of this circulating stream is withdrawn through pipe-line 18 and introduced into the generator 5. The amount of carbon dioxide thus withdrawn is preferably equal to that liberated in the generator 36 so that a substantially constant volume of carbon dioxide is kept circulating through the heat regenerator and the carbon dioxide generator. The carbon dioxide thus withdrawn may be passed through line 18 (valve 20 being open) and valve 4 up through the fuel bed in generator 5 where it is reduced to carbon monoxide. The carbon monoxide thus formed may be withdrawn through line 6, line 22 (valve 21 being open) and passed into the wash box 23, thence through the purification system 24 involving a unit containing lime or other material capable of absorbing carbon dioxide and a condenser and purification unit of any suitable type wherein water and/or other liquefiable vapors may be condensed and removed from the gas. The purified carbon monoxide may be stored in the holder 25.

As above described, the flow of the carbon dioxide through the fuel bed 5 takes place in an upward direction during a portion of the carbon monoxide make step. During the remaining portion of this step valves 20 and 21 are closed and carbon dioxide may be passed from line 18 through line 26 (valve 27 being open) and line 6 into the top of the generator and passed downwardly through the fuel bed therein, the resultant carbon monoxide gas being withdrawn through valve 4 and line 28 (valve 29 being open) which communicates with line 30 leading to the wash box 23. By alternating the flow of the carbon dioxide up and down through the fuel bed, substantially uniform temperature conditions may be maintained within the fuel bed and the maximum capacity of the generator utilized. A carbon monoxide make period of about six minutes, evenly divided between the uprun and downrun will usually be found satisfactory.

When the temperature of the fuel bed reaches a point below that satisfactory for efficient reduction of carbon dioxide to carbon monoxide, the make step is interrupted by closing valves 27 and 29 and the fuel bed is again blasted with air or other oxygen containing gas as hereinabove described. During this blasting cycle the resultant blast gases are preferably passed through valve 8', lines 7' and 9', into the regenerator 10' and the blast gases from which the sensible and latent heat has been extracted passed through lines 11' and valve 12' into and through a waste heat boiler such as a steam boiler (not shown) or into the atmosphere. Secondary air for supporting combustion of the blast gases may be admitted to line 7' through line 13' equipped with valve 14'.

Upon completion of this blasting cycle carbon dioxide may be circulated through heat regenerator 10' lines 9', 33', valve 34', line 35, carbon dioxide generator 36, cooler 37, drier 15, through line 17, valve 31', lines 32' and 11' by means of pump 16. As in the case of the preceding carbon monoxide make step hereinabove described, a portion of the circulating stream of carbon dioxide is withdrawn through line 18 and introduced into the generator 5 where it is reduced to carbon monoxide.

Operating as hereinabove described, only one heat regenerator need be employed associated with the generator 5. The other heat regenerator may be eliminated or, if desired, may be installed as a standby unit, i. e., used whenever it is necessary to make repairs or for other reasons discontinue the use of the first mentioned heat regenerator.

If desired, the arrangement of the two heat regenerators associated with the generator 5 shown on the accompanying drawing may be employed in the following manner: Assume regenerator 10 has been heated during a blasting step as hereinabove described and that during the succeeding carbon monoxide gas making step carbon dioxide has been circulated through heat regenerator 10 and carbon dioxide generator 36 and a portion of the circulating stream of carbon dioxide withdrawn and passed through the generator 5. During the succeeding blasting cycle the blast gases may flow through line 6 and valve 8' and be mixed with secondary air flowing through line 13' and valve 14'. The mixture of air and blast gases may then be passed through lines 7' and 9' into heat regenerator 10', the waste gases leaving the heat regenerator through lines 11' and 12'. Simultaneously carbon dioxide may be circulated by pump 16 through line 17, valve 31, lines 32 and 11 into heat regenerator 10 which contains residual heat not removed during the preceding carbon monoxide make step, the hot carbon dioxide passing through lines 9 and 33, valves 34, line 35, into carbon dioxide generator 36. Pump 16 may be employed to effect this flow of carbon dioxide. Preferably during this cycle of operation the cooler 37 and drier 15 are not employed and carbon dioxide generated in 36 withdrawn from the circulating stream and stored in the holder 13. The carbon dioxide thus produced may be passed from the holder 13 through the generator 5 during a subsequent carbon monoxide make step or may be otherwise employed. In like manner during the subsequent steps while blast gases from generator 5 are passed through heat regenerator 10 to heat the same, the residual heat in the regenerator 10' may be employed to liberate carbon dioxide in generator 36 and this carbon dioxide stored in the holder 13. I have found that sufficient heat may be stored in each heat generator during the blasting cycle to provide not only enough heat to raise the carbon dioxide to a temperature sufficient to decompose calcium carbonate during the carbon monoxide make step but to leave some residual heat which as hereinabove described may be utilized to liberate carbon dioxide from the calcium carbonate while the fuel bed in generator 5 is blasted and the heat of the blast gases stored in regenerator 10'.

The lime which is formed by the decomposition of the limestone in generator 36 may be removed from time to time during the process and fresh limestone added. A portion of the lime which is thus removed may be utilized in the purification system 24 for the extraction of carbon dioxide from the carbon monoxide containing gases passed therethrough. By so doing the lime may be reconverted into limestone, which may in turn be removed from the purification system and added whenever desired to the carbon dioxide generator 36.

It will be understood that the present invention is not confined to the above described operations, and that changes may be made without departing from the scope of the invention. For example, the gases from the heat regenerators 10 and 10' may be passed in heat-exchange relation with the carbon dioxide generator 36 to facilitate the decomposition of the limestone contained therein by externally heating the same. It may in some cases be found advantageous to add steam to the air or other oxygen containing gas introduced into the fuel bed so as to produce a mixture of water gas and producer gas which is burned in the heat regenerators.

By the process of this invention carbon monoxide may be prepared in a high state of purity such that it may advantageously be employed in metal refining, oil refining and other operations where a substantially pure carbon monoxide containing gas is required.

I claim:

1. The process of producing substantially pure carbon monoxide comprising blasting a body of carbonaceous material with an oxygen containing gas until said body of carbonaceous material is raised to an elevated temperature, conducting the hot blast gases thus produced away from said body of carbonaceous material, thereafter utilizing the heat of said hot blast gases to liberate carbon dioxide from carbon dioxide containing material, and after the said blasting step passing said carbon dioxide through the said heated body of carbonaceous material to produce carbon monoxide.

2. The process of producing substantially pure carbon monoxide comprising subjecting a body of coke to partial oxidation to produce a combustible gas and to heat the unoxidized portion of said body of coke to an elevated temperature, conducting said combustible gas through a heat regenerator, storing the sensible heat of said combustible gas in the regenerator, utilizing the said stored heat to decompose limestone and produce carbon dioxide, and passing the thus produced carbon dioxide through the aforesaid body of coke to produce carbon monoxide.

3. The process of producing substantially pure carbon monoxide comprising subjecting a body of coke to partial oxidation in one zone to produce a combustible gas and to heat the unoxidized portion of said body of coke substantially to incandescence, burning said combustible gas in another zone and storing the resultant heat in said other zone, passing carbon dioxide through said heated second zone, passing the thus heated carbon dioxide through a body of limestone in a third zone whereby said limestone is decomposed and carbon dioxide produced, and passing the thus produced carbon dioxide through the aforesaid incandescent body of coke to produce carbon monoxide.

4. The process of producing substantially pure carbon monoxide comprising subjecting a portion of a body of coke to partial oxidation in one zone by blasting the same with an oxidizing gas to produce a combustible gas and to heat the unoxidized portion of said coke to incandescence, burning said combustible gas in another zone, utilizing the heat developed by said burning of the combustible gas to raise the temperature of said second zone substantially to 2000° F., passing carbon dioxide through said second zone to heat said carbon dioxide to a temperature substantially above the decomposition temperature of calcium carbonate, passing the thus heated carbon dioxide through a body of calcium carbonate whereby additional carbon dioxide is formed, cooling the thus produced carbon dioxide, passing said cooled carbon dioxide in contact with a drying agent to remove water therefrom, and passing the thus purified carbon dioxide through said incandescent body of coke to reduce said carbon dioxide to carbon monoxide.

5. The cyclic process of producing substantially pure carbon monoxide, one cycle of which comprises blasting a fuel bed to produce blast gases and raise the temperature of the fuel bed to a point suitable for the reduction of carbon dioxide to carbon monoxide and storing the heat of the resultant blast gases in a heat regenerator, and another cycle of which comprises circulating carbon dioxide through the hot regenerator and through carbon dioxide-containing material to liberate carbon dioxide while simultaneously removing a portion of the circulating carbon dioxide stream and passing the portion thus removed through the hot fuel bed to reduce the carbon dioxide to carbon monoxide.

6. The cyclic process of producing substantially pure carbon monoxide which comprises the following steps in alternate relation: Step 1, blasting a fuel bed to produce blast gases and raise the temperature of the fuel bed to a point suitable for the reduction of carbon dioxide to carbon monoxide and storing the sensible and latent heat of the resultant blast gases in a heat regenerator; and Step 2, circulating carbon dioxide through the hot regenerator to heat the carbon dioxide and through a body of calcium carbonate to liberate carbon dioxide therefrom, while simultaneously removing a portion of the carbon dioxide from the circulating stream and passing the portion thus removed through the hot fuel bed to reduce it to carbon monoxide.

LOUIS L. NEWMAN.